Oct. 9, 1923.
M. DE ROIBOUL
ELECTRIC FURNACE
Filed Sept. 28, 1920   3 Sheets-Sheet 1
1,470,195
Fig. 1
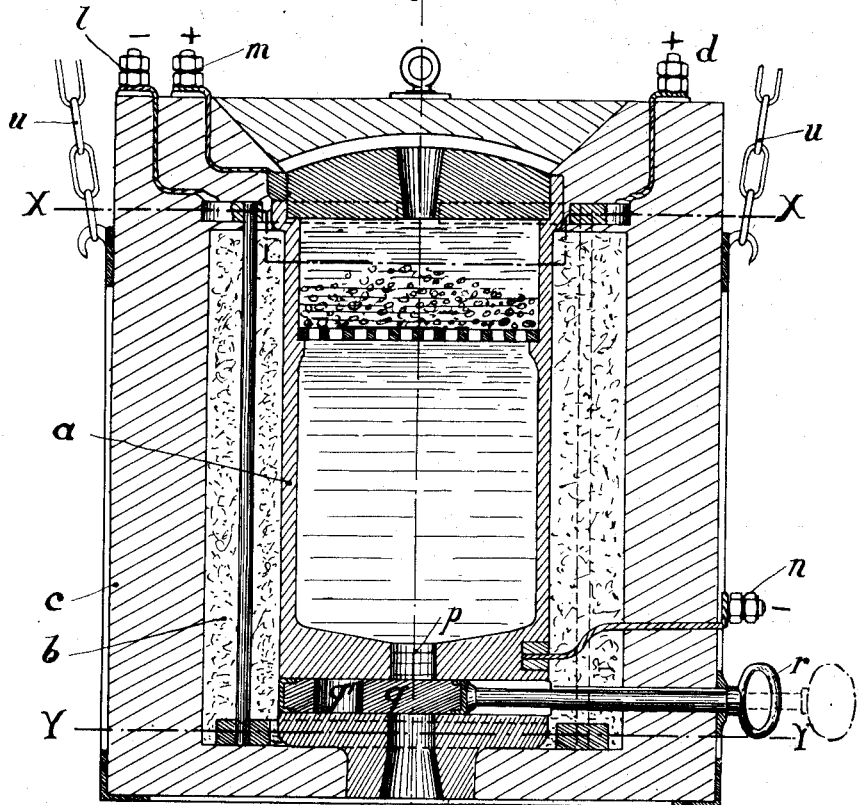
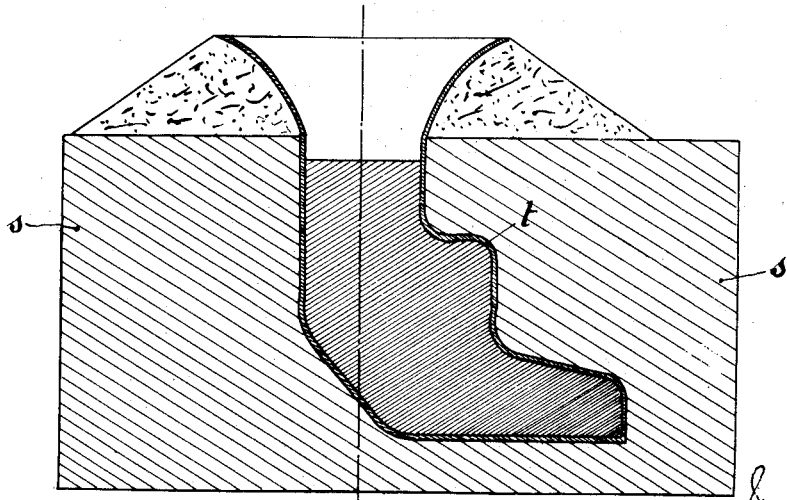
Inventor
Michel de Roiboul,
By Henry Ooh Jr.
Atty.

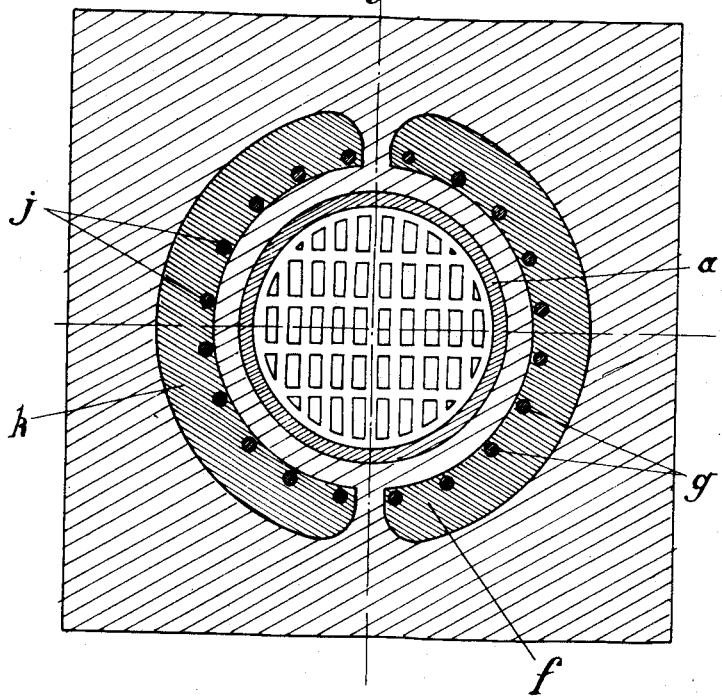
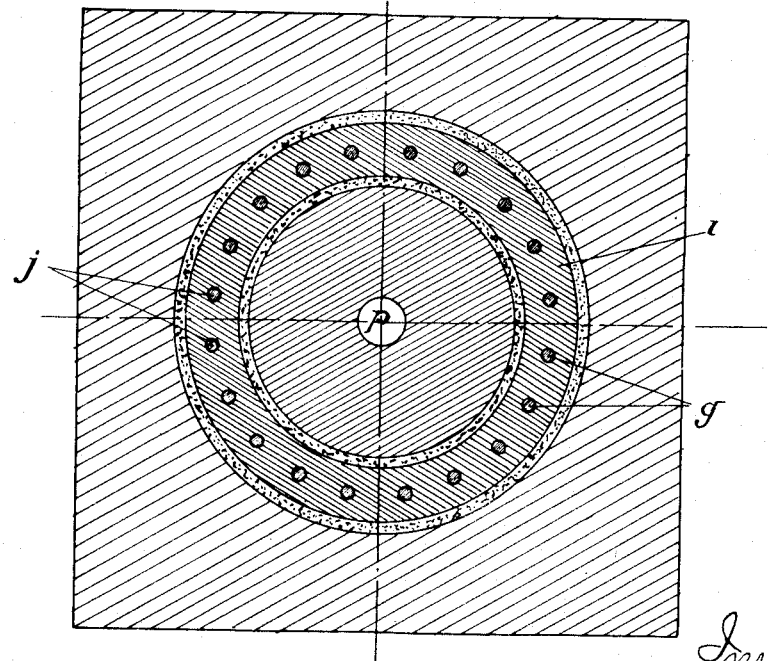

Patented Oct. 9, 1923.

1,470,195

UNITED STATES PATENT OFFICE.

MICHEL DE ROIBOUL, OF PARIS, FRANCE.

ELECTRIC FURNACE.

Application filed September 28, 1920. Serial No. 413,423.

*To all whom it may concern:*

Be it known that I, MICHEL DE ROIBOUL, a Russian subject, residing at 15 Avenue Pierre 1$^{er}$ de Serbie, Paris, Seine, in the Republic of France, have invented certain new and useful Improvements in Electric Furnaces; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Hitherto it has only been possible to fuse refractory minerals, (such, for instance, as sand, rock-crystal, quartz, and the like belonging to the silica group, and alumina, corundum, and the like, belonging to the alumina group) by means of the oxy-hydrogen blowpipe, owing to the very high fusing temperature (over 1700° centigrade) of these substances and to their corrosive action when in a molten state.

The present invention provides a process for the fusion of such minerals by means of an electric furnace, preferably open to the atmosphere and provided with a crucible made of refractory oxide, such as oxide of zirconium, of yttrium, of erbium, or of thorium or the like, or mixtures thereof, which crucible will resist the action of the molten mineral, such action, at high temperatures, being analogous to that of a very powerful acid.

When the mineral is fused it can be poured into moulds which may be constructed in the ordinary manner of sand, but covered with a suitable facing of refractory oxide. After pouring, the castings can be cooled either suddenly, or gradually, their structure being preserved when cooled suddenly and becoming crystalline, when cooled gradually.

The manner in which the invention can be performed will be understood from the following example with reference to the accompanying drawing.

Figure 4:
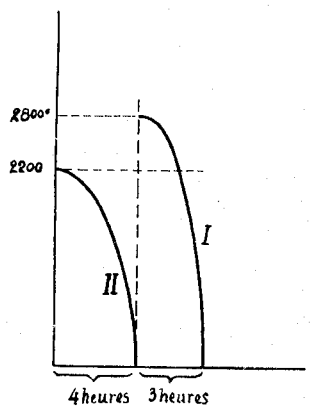
Figure 5:
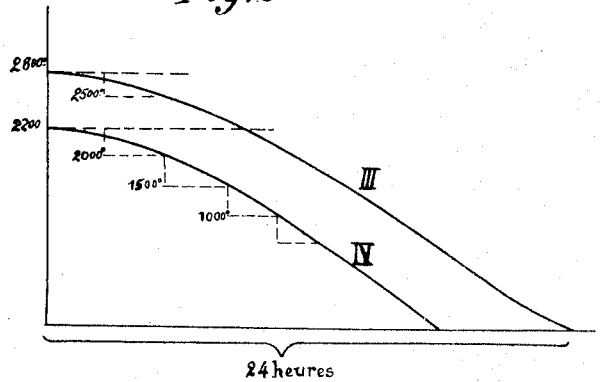

Figure 1 is a vertical section of a suitable form of the furnace, with the mould arranged underneath. Figures 2 and 3 are horizontal sections respectively taken on the lines X—X and Y—Y Figure 1. Figures 4 and 5 show the cooling curves.

The raw material (for example white sea-sand, yellow sand, red sand, transparent coloured, (amethyst) or colourless, crystal quartz, or the like, or alumina, corundum, or the like) is placed in a crucible $a$ made of refractory oxide and having, for example, the following composition:—

Zirconium oxide ($ZrO_2$) 60 per cent.
Yttrium oxide ($Yt_2O_3$) 15 per cent.
Thorium oxide ($ThO_2$) 5 per cent.
Erbium oxide ($ErO$) 20 per cent.

The said crucible is surrounded by an insulating wall $b$, for example of powdered magnesium and zirconium, and is enclosed in an outer casing $c$ of refractory bricks. The electric furnace is heated by resistance in two stages. At the outset the current is admitted at $d$ to the upper half-ring $f$ and passes thence through the carbon rods $g$ terminating at one end in the half ring $f$ and at the other end in the lower ring $i$ from which lower ring it passes through the carbon rods $j$ terminating at one end in said lower ring $i$ and at the other end in the upper half-ring $k$ which is insulated from the half-ring $f$ the electric current passing through the said half-ring $k$, and out by the terminal $l$. In consequence of the resistance opposed to the passage of the current, the carbon conductors are heated, and the body of the furnace is thereby raised to a temperature of about 500° centigrade. At this temperature, however, the crucible ceases to be a bad conductor and the electric current (which is of low amperage and high voltage) enters at $m$, traverses the whole of the crucible $a$, which constitutes a resistance, and passes out at $n$.

The crucible is then raised to a sufficient temperature for fusing all the minerals, that is to say to from 1800° to 2700° centigrade.

In addition to the members described the crucible comprises a taphole $p$, closed by a slide $q$ of the same material as the crucible and provided with a passage $q^1$.

The pouring is effected by pulling the slide $q$ outwards by means of the handle $r$, the contents of the crucible being thereby discharged into any suitable mould $s$ which may be of ordinary sand for example. It is however essential that the walls of the mould $a$, which come into contact with the molten charge, be previously faced with a special lining $t$ of refractory oxide; such for instance, as a lining of the same composition as that of the crucible $a$. The oxide, or mixture of oxides, however, instead of being baked as in making the crucible, can be reduced to powder and mixed in the cold with water containing sugar.

The furnace may, if desired, be suspended for example by means of chains $u$ hooked to a metal holder as shown in Figure 1.

After pouring, the castings may be cooled quickly (say within three, or four, hours) or gradually, (say in a day, or more) according to the required condition of the casting. Quick cooling may be effected, for example by exposing the mould to the air (curve I in Figure 4 relating to alumina, and curve II to silica), whilst slow cooling can be effected by surrounding the mould with a good heat insulator, or by placing the mould in an ordinary electric furnace, the temperature of which is progressively reduced; (see curve III of Figure 5 relating to alumina and curve IV relating to silica.)

When the casting is cooled quickly it preserves the amorphous structure it possesses at the moment of complete fusion, but, when cooled slowly it crystallizes. The physical structure of the amorphous castings may be compared to that of glass, and the physical structure of the crystallized castings to that of cast steel, which is also composed of an aggregation of small crystals.

The castings in question have the following properties (1) The fusing point of the castings is above 1700° centigrade, and they become pasty above 1500° centigrade. In the case of the silica group, the maximum fusing temperature does not exceed about 2200° centigrade. In the case of the alumina group it is not above 2800°.

(2) The castings are very coherent, and strong and do not waste, disintegrate, or otherwise deteriorate.

(3) The castings are free from air bubbles, which is due to the fact that at the moment of pouring, the mineral is in a perfectly liquid condition so that the air which would form bubbles can escape from the surface of the molten mass.

(4) The castings are usually transparent, but if desired they may be coloured by the addition of colouring matter, at the moment of fusion. The transparent varieties of cast silica resemble raw natural rock-crystal. They are greatly superior to optical glass as regards their co-efficient of refraction and their transparency to the ultra-violet rays. The coloured cast minerals, when crystallized artificially, exhibit all the specific properties of coloured precious stones. Thus, these crystallized castings become rubies, sapphires, emeralds and other coloured precious stones, which have the same chemical composition, physical properties and optical co-efficients as the natural stones.

(5) The physical properties of the said castings are:—specific gravity, between 2 and 3 and hardness between, 8 and 9. Their resistance to fracture exceeds that of steel, the resistance of the alumina castings being three times as great as that of the silica castings. Their co-efficient of expansion is exceedingly low, being about 0.00000059, or nearly one-seventeenth that of glass. In view of this low co-efficient, no appreciable deformation is set up in the castings by changes of temperature, and therefore there is an almost entire absence of the internal stress which renders ordinary glass so fragile under sudden changes of temperature, or under the influence of shock. It follows that as a result of the absence of internal tension, (due to the very low co-efficient of expansion) the amorphous mineral castings are not fragile, and are practically unbreakable. They also possess the remarkable property that all the deformations they sustain are elastic up to their limits of resistance, and unlike metals, they are not subject to disintegration by gradual crystallization under repeated shocks.

The said mineral castings may be employed as the raw materials for such purposes as the following for example:—

(1) As substitutes for optical glass.

(2) For purposes similar to those for which ordinary glass is used.

(3) For purposes the same as those for which porcelain, faience, bricks, articles in terra-cotta, and the like, are used.

(4) In the construction of machinery, the said castings may be used in place of castings of steel, or other metals, and are more particularly suitable for the construction of engines for aeroplanes and motor cars and for marine work, locomotives, machine tools, rails, wheels, screws, screw-nuts and many other kinds of machines, or machine parts, which are required to possess strength, solidity, lightness, hardness and perfect precision. They may also be employed in the manufacture for example, of cannon, armor plate, turbines, ball bearings, and the like.

(5) For building purposes, the said castings may replace bricks, ferro-concrete, the various kinds of hard and ordinary stone, more particularly for road paving and for the construction of walls and roofs.

(6) Cast marble may be employed in the fine arts.

(7) In jewelry the crystallized and coloured cast minerals or artificial crystalline precious stones may when moulded, find similar application to that of the real stones and have their true colours.

(8) In the electrical industry these castings being perfect insulators, may replace those usually employed.

It will be understood that the hereinbefore described method of pouring may be modified without departing from the nature of this invention.

What I claim is—

1. In an electrical furnace a crucible, comprising zirconium, yttrium, and erbium oxides, means to heat said crucible to conducting temperature and means for supplying high voltage current to the crucible when heated to conductivity.

2. In an electric furnace a crucible comprising zirconium, yttrium, erbium and thorium oxides, means to heat the crucible to conducting temperature and means for supplying high voltage current to the crucible when heated to conductivity.

In testimony that I claim the foregoing as my invention, I have signed my name.

MICHEL DE ROIBOUL.